United States Patent
Kim et al.

(10) Patent No.: US 6,580,487 B1
(45) Date of Patent: Jun. 17, 2003

(54) FRINGE FIELD SWITCHING LIQUID CRYSTAL DISPLAY

(75) Inventors: Eun Sik Kim, Kyoungki-do (KR); Young Keun Lee, Kyoungki-do (KR)

(73) Assignee: Boe-Hydis Technology Co., Ltd., Kyoungki-do (KR)

(*) Notice: Subject to any disclaimer, the term of this patent is extended or adjusted under 35 U.S.C. 154(b) by 0 days.

(21) Appl. No.: 09/606,731

(22) Filed: Jun. 29, 2000

(30) Foreign Application Priority Data

Jun. 29, 1999 (KR) .......................................... 99-25223

(51) Int. Cl.$^7$ .......................................... G02F 1/1343
(52) U.S. Cl. ...................................... 349/141; 349/143
(58) Field of Search .................................. 349/141, 143

(56) References Cited

U.S. PATENT DOCUMENTS

| | | |
|---|---|---|
| 4,542,960 A | 9/1985 | Yang |
| 4,643,533 A | 2/1987 | Armitage |
| 5,309,264 A | 5/1994 | Lien et al. |
| 5,576,862 A | 11/1996 | Sugiyama et al. |
| 5,914,762 A * | 6/1999 | Lee et al. .................. 349/141 |
| 5,959,708 A | 9/1999 | Lee et al. |
| 6,233,034 B1 * | 5/2001 | Lee et al. .................. 349/141 |
| 6,256,081 B1 * | 7/2001 | Lee et al. .................. 349/141 |

FOREIGN PATENT DOCUMENTS

| | | |
|---|---|---|
| JP | 55138922 | 10/1980 |
| JP | 57069281 | 4/1982 |
| JP | 58083478 | 5/1983 |
| JP | 60222825 | 11/1985 |
| JP | 02071616 | 3/1990 |
| JP | 11167120 | 6/1999 |
| JP | 11282427 | 10/1999 |

* cited by examiner

*Primary Examiner*—Toan Ton
(74) *Attorney, Agent, or Firm*—Ladas & Parry

(57) ABSTRACT

Disclosed is a fringe field switching liquid crystal display capable of improving picture quality by minimizing vertical components in a fringe field. The fringe field liquid crystal display includes: a lower substrate; a gate bus line extended on the lower substrate in a selected direction; a data bus line disposed to cross the gate bus line, thereby defining a sub pixel; a thin film transistor disposed at an intersection of the gate bus line and the data bus line; a counter electrode formed at each sub pixel and formed in shape of a rectangular plate, the counter electrode to which a common signal is continuously transmitted; and a pixel electrode electrically connected to the thin film transistor and comprising a plurality of teeth which are overlapped with the counter electrode so as to form a fringe field with the counter electrode, wherein the counter comprises a plurality of slits, and the slits are disposed between the teeth of the pixel electrode, and the counter electrode and the pixel electrode are made of a transparent conductor.

1 Claim, 5 Drawing Sheets

(+) Frame (−) Frame

FRINGE FIELD SWITCHING LIQUID CRYSTAL DISPLAY

FIELD OF THE INVENTION

The present invention relates to a fringe field switching liquid crystal display("LCD"), and more particularly to a fringe field switching LCD reducing vertical components of a fringe field that is generated between a counter electrode and a pixel electrode.

BRIEF DESCRIPTION OF THE INVENTION

Generally, the fringe field switching liquid crystal display ("FFS-LCD") is proposed to substitute a general in-plane switching liquid crystal display("IPS-LCD") having low aperture ratio and transmittance, a corresponding patent application has been filed in the Rep. of Korea in application number of 98-9243.

The foregoing FFS-LCD includes upper and lower substrates being separated with a selected cell gap, a liquid crystal layer, and counter and pixel electrodes formed at an inner surface of the lower substrate. The counter and the pixel electrodes are made of transparent conductor, a distance between the counter electrode and the pixel electrode is smaller than the cell gap. As a result, fringe fields are formed between electrodes and on the electrodes.

FIG. 1 is a plane view of a lower substrate structure of the FFS-LCD.

Referring to FIG. 1, a gate bus line 3 and a data bus line 7 are disposed on a lower substrate 1 in a cross or a matrix type, thereby defining a sub pixel Pix. A thin film transistor TFT is disposed adjacent to an intersection of the gate bus line 3 and the data bus line 7. A counter electrode 2 is made of transparent conductor and is formed at each sub pixel Pix. Here, the counter electrode 2 is in shape of a rectangular plate or a comb. A common signal line 30 for continuously providing common signals to the counter electrode 2, is disposed in contact with the counter electrode 2. Herein, the common signal line 30 is made of a metal layer having excellent signal transmittance property, generally a metal layer for gate bus line. In addition, the common signal line 30 includes a first part 30a being parallel to the gate bus line 3 and being in contact with a selected portion of the counter electrode 2, and a second part 30b being extended from the first part 30a parallel to the data bus line 7 and being disposed between the counter electrode 2 and the data bus line 7. A pixel electrode 9 is formed at the sub pixel Pix so that the pixel electrode 9 overlaps with the counter electrode 2. At this time, the pixel electrode 9 is electrically insulated from the counter electrode 2. The pixel electrode 9 is formed in shape of a comb, and includes a tooth part 9a having a plurality of teeth which are disposed parallel to the data bus line 7 and arranged with a uniform distance from each other, and a bar 9b contacting one end of the tooth part 9a and being in contact with a selected portion of the thin film transistor TFT. Meanwhile, although not shown in drawings, an upper substrate opposing the lower substrate 1 is opposed with a greater distance than that of the pixel electrode 9 and the counter electrode 5.

Operation of the foregoing FFS-LCD is as follows. When an electric field is formed between the counter electrode 5 and the pixel electrode 9, the distance between the counter electrode 5 and the pixel electrode 9, i.e. the thickness of gate insulating layer is greater than that of the upper and the lower substrates, thereby generating a fringe field between and on the electrodes. The fringe field influences over the entire counter electrode 5 and the pixel electrode 9, thereby driving all liquid crystal molecules on the electrodes. Accordingly, high aperture ratio and high transmittance are realized.

However, the conventional FFS-LCD has following problems.

First, since the distance between the tooth part 9a of the pixel electrode 9 and the counter electrode 5 is smaller than the cell gap, i.e. the distance between upper and lower substrates, vertical components exist in the fringe field.

These vertical components of the fringe field are only generated on upper region of the electrodes, and long axes of the liquid crystal molecules which should be parallel to the substrates are disposed almost vertical to the substrates. Therefore, mis-alingment of the liquid crystal molecules results and there is found some defects in the picture quality.

Moreover, the vertical components FA of the fringe field are shown in the different types, as shown in FIGS. 2 and 3, with respect to the (+) frame of LCD and (−) frame of LCD. Accordingly, arrangements of liquid crystal molecules 10a in the (+) frame in the (−) frame are different from each other, a difference in the brightness occurs. Due to the difference in the brightness, a DC bias is applied to the liquid crystal layer thereby degrading the liquid crystal molecules. As a result, the defect in the picture quality occurs.

SUMMARY OF THE INVENTION

Accordingly, the object of the present invention is to provide an FFS-LCD capable of minimizing the vertical components of the fringe field and improving picture quality.

To accomplish the foregoing object, one embodiment of the present invention provides an FFS-LCD including: a lower substrate; a gate bus line extended on the lower substrate in a selected direction; a data bus line disposed to cross the gate bus line, thereby defining a sub pixel; a thin film transistor disposed at an intersection of the gate bus line and the data bus line; a counter electrode formed at each sub pixel and formed in shape of a rectangular plate, the counter electrode to which a common signal is continuously transmitted; and a pixel electrode electrically connected to the thin film transistor and comprising a plurality of teeth which are overlapped with the counter electrode so as to form a fringe field with the counter electrode, wherein the counter comprises a plurality of slits, and the slits are disposed between the teeth of the pixel electrode, and the counter electrode and the pixel electrode are made of a transparent conductor.

Further, another embodiment of the present invention provides an FFS-LCD including: a lower substrate; a gate bus line extended on the lower substrate in a selected direction; a data bus line disposed to cross the gate bus line, thereby defining a sub pixel; a thin film transistor disposed at an intersection of the gate bus line and the data bus line; a counter electrode formed at each sub pixel and formed in shape of a rectangular plate, the counter electrode to which a common signal is continuously transmitted; and a pixel electrode electrically connected to the thin film transistor and comprising a plurality of teeth which are overlapped with the counter electrode so as to form a fringe field and the teeth are parallel with the data bus line, wherein the counter comprises a plurality of slits, and the slits are disposed between the teeth of the pixel electrode, and the counter electrode and the pixel electrode are made of a transparent conductor.

DETAILED DESCRIPTION OF THE PREFERRED EMBODIMENTS

Figure 1:
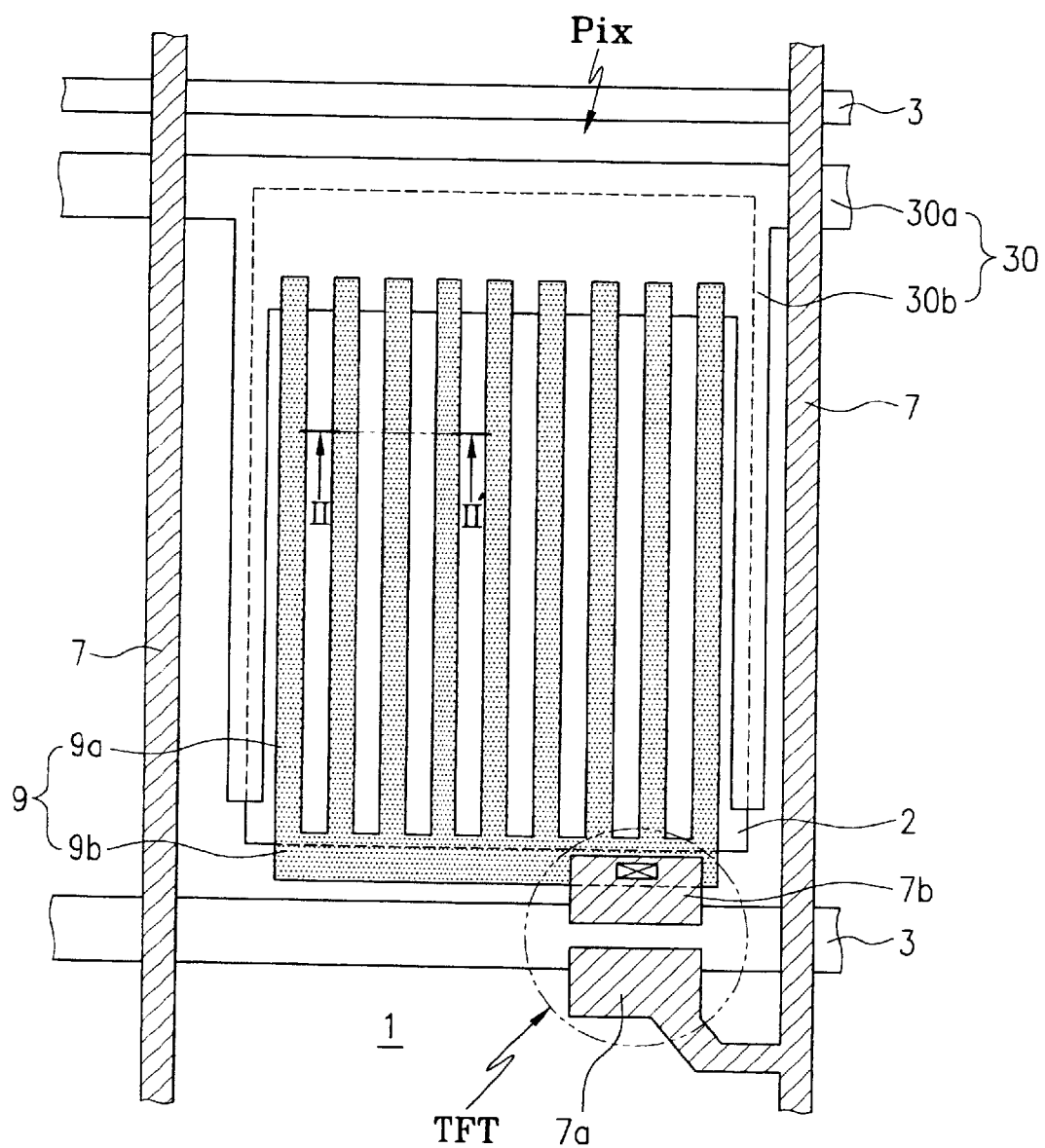
FIG. 1 is a plane view of a general FFS-LCD.
Figure 2:
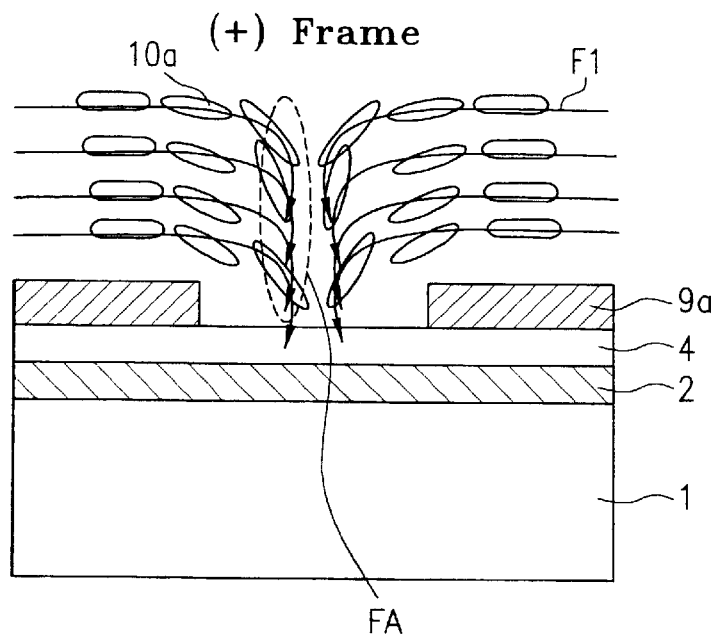
FIG. 2 is a cross-sectional view taken along the line II–II' of FIG. 1, for illustrating the arrangement of liquid crystal molecules in case of (+) frame.
Figure 3:
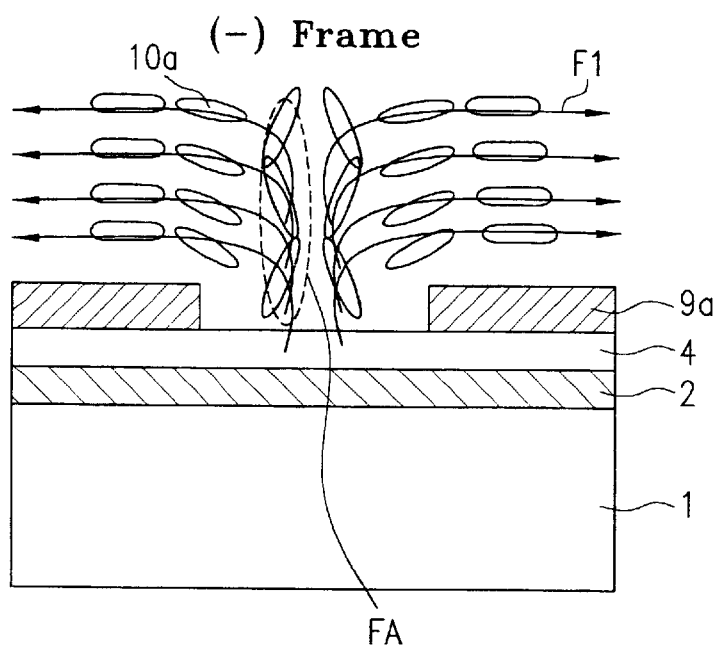
FIG. 3 is a cross-sectional view taken along the line II–II' of FIG. 1, for illustrating the arrangement of liquid crystal molecules in case of (−) frame.
Figure 4:
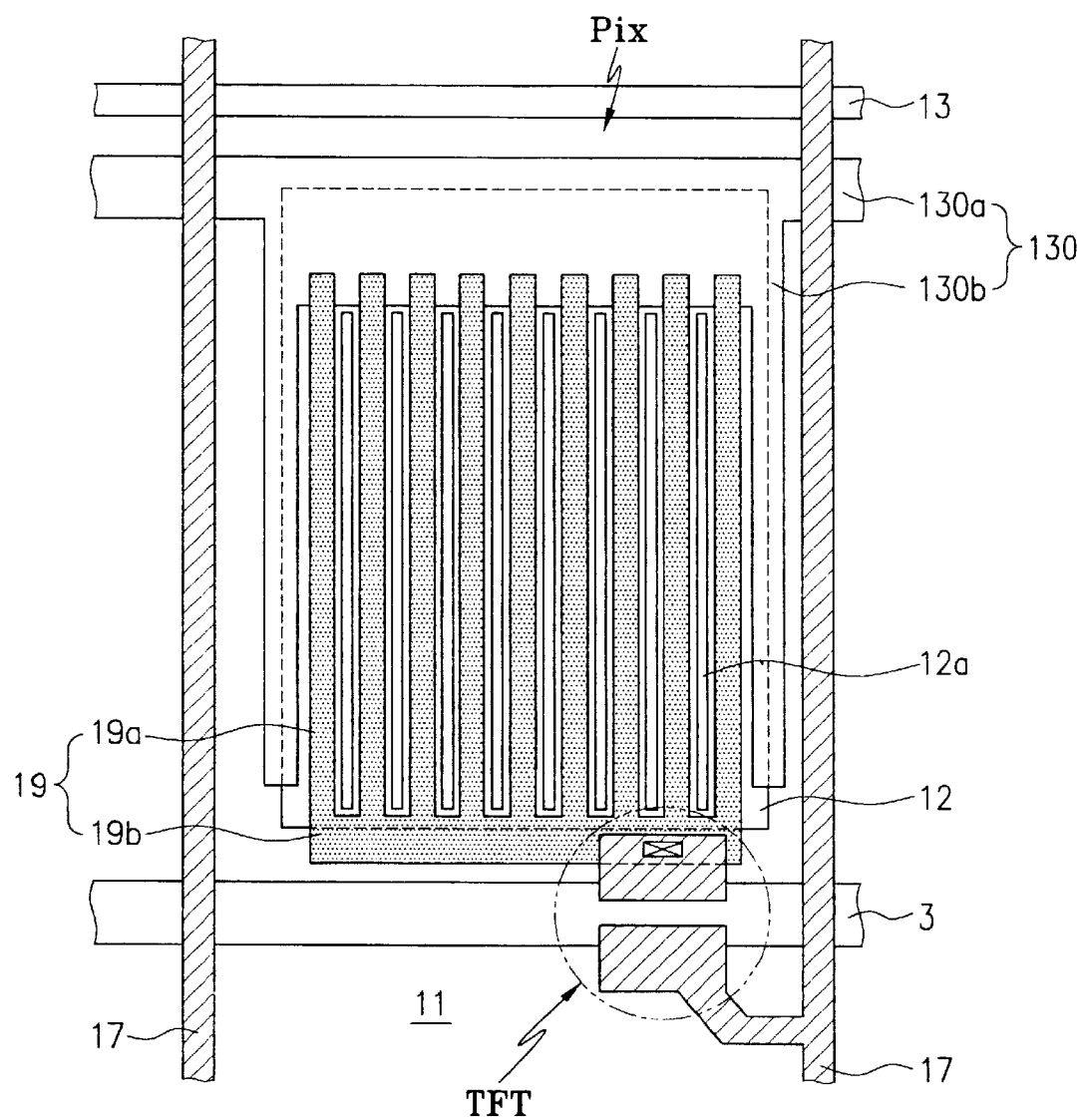
FIG. 4 is a plane view for showing the FFS-LCD according to the present invention.
Figure 5:
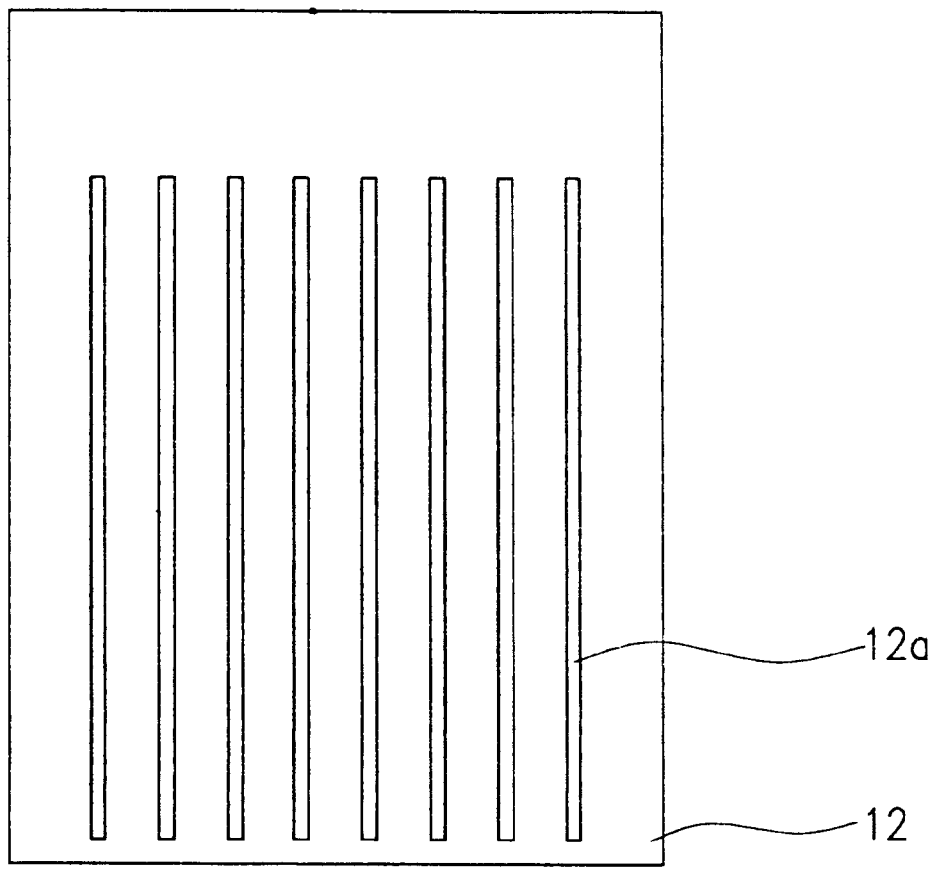
FIG. 5 is a plane view for showing a counter electrode of the FFS-LCD according to the present invention.

First, referring to FIG. 4, a gate bus line 13 is extended to an upper portion of a lower substrate 11 in a direction of x shown in drawings, a data bus line 17 is extended in a direction of y which is substantially perpendicular to the gate bus line 13, thereby defining a sub pixel pix of a rectangular shape in the lower substrate 11 Herein, as known in the art, the gate bus line 13 and the data bus line 17 are insulated from each other by a gate insulating layer (not shown). A thin film transistor TFT is disposed adjacent to an Intersection of the gate bus line 13 and the data bus line 17. The counter electrode 12 is formed at each sub pixel. The counter electrode 12 is made of a transparent conductive layer, for example ITO materials, and formed in the shape of a plate, preferably a rectangular plate. Further, the counter electrode 12 includes a plurality of slits 12a. Here, long axes of the silts 12a are parallel to the data bus line 17 and the respective slits 12a are disposed parallel to each other and separated with a uniform distance. Only the counter electrode 12 as described above is illustrated in FIG. 5. Meanwhile, a common signal line 130 is in contact with a selected portion of the counter electrode 12 and transmits common signals to the counter electrode 12. The common signal line 130 includes a first 130a being parallel to the gate bus line 13 and being in contact with a selected portion of the counter electrode 12, and a second part 130b being extended from the first part 130a parallel to the data bus line 17 and being disposed between the counter electrode 12, and a second part 130b being extended from the first part 130a parallel to the data bus line 17 and being disposed between the counter electrode 12 and the data bus line 17. A pixel electrode 19 is formed at each sub pixel pix to overlap the counter electrode 12. The pixel electrode 19 includes a plurality of teeth 19a parallel to the data bus line 14 and being disposed between the slits 12a, and a bar 19b connecting one end of the teeth 19a and being in contact with a drain electrode of the thin film transistor TFT. At this time, distances between the teeth 19a is greater than the width of the slits 12a. As a result, the slits 12a are exposed through spaces between the teeth 19a. Additionally, the pixel electrode 19, similar to the counter electrode 12, is made of a transparent conductor, for example an ITO material. Further, a distance between the teeth 19a of the pixel electrode 19 and the counter electrode 12 is smaller than that of the upper and lower substrates. In addition, the width of the teeth 19a of the pixel electrode 19 and the width of the exposed counter electrode 12 are determined such that a fringe field can influence to the upper region of those electrodes.

Operation of the foregoing FFS-LCD of the present invention is as follows. When a voltage difference exists between the counter electrode 12 and the pixel electrode 19, there is generated a fringe field F between the counter electrode 12 and the teeth 19a of the pixel electrode 19. Herein, the fringe field F is formed between the exposed counter electrode 12 of both ends of the slit 12a and the teeth 19a of the pixel electrode 19, therefore no vertical component is needed. That is, a certain portion of the fringe field which has been shown as the vertical component is curved toward the outside of the slit 12a by the slit 12a. As a result, the defect in picture quality is eliminated. Herein, the reference numeral 14 in the drawing signifies a gate insulating layer.

Figure 6:
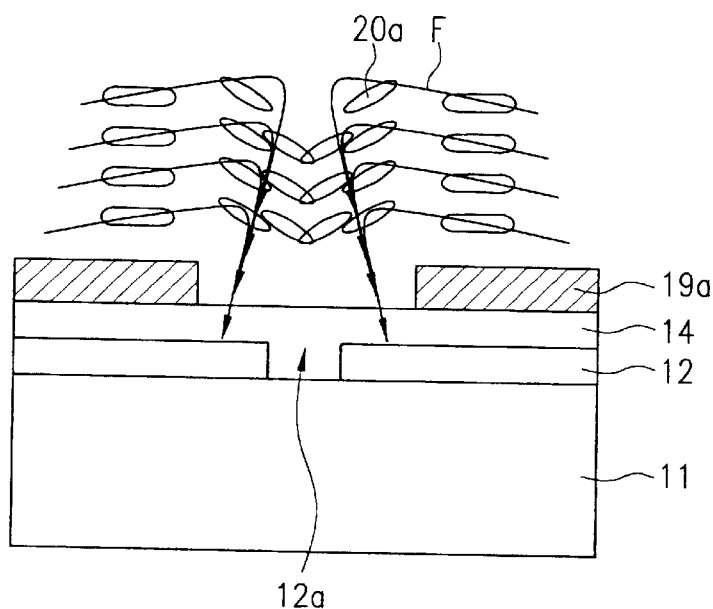
FIG. 6 is a cross-sectional view taken along the line VI–VI' of FIG. 4, for illustrating the arrangement of liquid crystal molecules in case of (+) frame.
Figure 7:
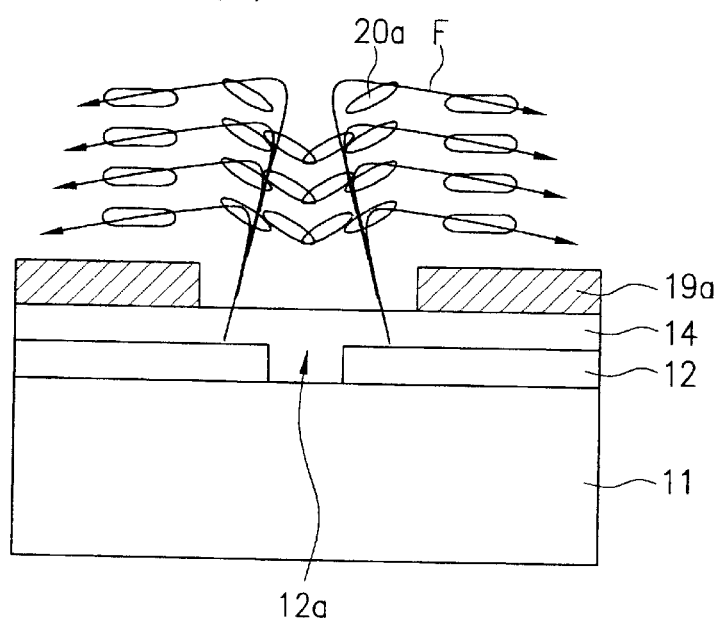
FIG. 7 is a cross-sectional view taken along the line VI–VI' of FIG. 4, for illustrating the arrangement of liquid crystal molecules in case of (−) frame.

Moreover, as described in the present invention, when the slit 12a is formed at the exposed counter electrode 12, no voltage difference is occurred as shown in FIGS. 6 and 7 since an identical electric field is formed at the (+) frame and at the (−) frame respectively. Additionally, because no voltage difference is occurred, application of DC bias to the liquid crystal molecules also reduced, thereby preventing degrading of liquid crystal molecules. As a result, the defect in picture quality is eliminated.

As discussed above in detail, in the FFS-LCD according to the present invention, slits are formed in the counter electrode exposed by the teeth of the pixel electrode, and have the width smaller than the distance between the teeth. As a result, the vertical components of the FFS-LCD are removed between the teeth of the pixel electrode and the counter electrode, thereby preventing the mis-alignment of liquid crystal molecules. Additionally, the fringe fields of the (+) frame and the (−) frame are formed in the same configuration, thereby reducing differences of the arrangement of liquid crystal molecules. Therefore, picture quality of the liquid crystal display is greatly enhanced.

Various other modifications will be apparent to and can be readily made by those skilled in the art without departing from the scope and spirit of the present invention.

What is claimed is:

1. A fringe field switching liquid crystal display (FFS-LCD) comprising:

a lower substrate;

a gate bus line extended on the lower substrate in a selected direction;

a data bus line disposed to cross the gate bus line, thereby defining a sub pixel;

a thin film transistor disposed at an intersection of the gate bus line and the data bus line;

a counter electrode formed at each sub pixel and formed in the shape of a plate, the counter electrode having a common signal continuously transmitted thereto; and a pixel electrode electrically connected to the thin film transistor and comprising a plurality of teeth which overlap an upper part of the counter electrode so as to form a fringe field with the counter electrode, wherein the counter electrode comprises a plurality of slits, the minor axis of the slit having a width smaller than the distance between the teeth of the pixel electrode and the major axis of the slit having a width parallel with the major axis of the teeth, and said slits are fully exposed through spaces between the teeth; and the counter electrode and the pixel electrode are made of a transparent conductor.

* * * * *